United States Patent
West

(10) Patent No.: US 9,060,407 B2
(45) Date of Patent: Jun. 16, 2015

(54) PORTABLE LIGHTING DEVICE WITH RECONFIGURABLE USER INTERFACE

(75) Inventor: Stacey H. West, Upland, CA (US)

(73) Assignee: Mag Instrument, Inc., Ontario (CA)

( * ) Notice: Subject to any disclaimer, the term of this patent is extended or adjusted under 35 U.S.C. 154(b) by 891 days.

(21) Appl. No.: 12/928,519

(22) Filed: Dec. 13, 2010

(65) Prior Publication Data

US 2012/0146552 A1 Jun. 14, 2012

(51) Int. Cl.
*H05B 37/00* (2006.01)
*H05B 33/08* (2006.01)
*H05B 37/02* (2006.01)

(52) U.S. Cl.
CPC ........ *H05B 33/0854* (2013.01); *H05B 37/0209* (2013.01); *Y02B 20/40* (2013.01)

(58) Field of Classification Search
USPC .................................. 315/200 A, 193, 209 R
See application file for complete search history.

(56) References Cited

U.S. PATENT DOCUMENTS

| 8,356,910 | B2* | 1/2013 | Messinger et al. ............ 362/183 |
| 8,425,078 | B2* | 4/2013 | Matthews et al. ............ 362/206 |
| 2006/0146527 | A1* | 7/2006 | VanderSchuit ............... 362/228 |
| 2006/0187658 | A1 | 8/2006 | Evans et al. |
| 2008/0272714 | A1* | 11/2008 | Noble et al. .................. 315/292 |
| 2008/0272928 | A1* | 11/2008 | Shuster .................... 340/815.75 |
| 2009/0097235 | A1* | 4/2009 | Chambers .................... 362/110 |
| 2009/0284185 | A1 | 11/2009 | Koch et al. |
| 2010/0157582 | A1 | 6/2010 | Bertken |
| 2010/0177508 | A1* | 7/2010 | Maglica ........................ 362/183 |
| 2010/0219775 | A1* | 9/2010 | Maglica et al. ............... 315/362 |

OTHER PUBLICATIONS

PCT, International Search Report and Written Opinion, Sep. 14, 2012, 9 pages.

* cited by examiner

*Primary Examiner* — Minh D A
(74) *Attorney, Agent, or Firm* — Maceiko IP

(57) ABSTRACT

A portable lighting device that provides different user interfaces that may be selected by the user. Each user interface may provide one or more operational modes, such as on mode, power save mode, strobe mode or momentary mode. After a user interface is selected, the user may select on of the operational modes. The portable lighting device may be a flashlight.

40 Claims, 6 Drawing Sheets

PORTABLE LIGHTING DEVICE WITH RECONFIGURABLE USER INTERFACE

FIELD OF THE INVENTION

The current invention generally relates to portable lighting devices, such as flashlights, including such devices where the user interface and/or modes of operation may be reconfigured by the user.

BACKGROUND OF THE INVENTION

Various portable lighting devices, including flashlights, are known in the art. Such lighting devices typically include one or more batteries having positive and negative electrodes. The batteries may be arranged electrically in series or parallel in a battery compartment or housing.

An electrical circuit is established from a battery electrode through conductive means which are electrically coupled to an electrode of a light source, such as a light emitting diode ("LED") or other type of lamp bulb. After passing through the light source, the electric circuit continues through a second electrode of the light source in electrical contact with conductive means, which in turn are in electrical contact with the other electrode of a battery. The circuit includes a switch to open or close the circuit. Actuation of the switch to close the electrical circuit enables current to pass through the lamp bulb, LED or other light source thereby generating light.

Some advanced portable lighting devices provide multiple modes of operation for different needs. For example, in addition to a typical full power or standard power mode, some advanced flashlights may include a power reduction mode, a blink or strobe mode, an SOS mode, a momentary mode and/or other mode(s). The group of different operating modes provided by a particular lighting device may be referred to as the user interface in that the user may interface with the lighting device to select one of the available operating modes.

Such portable lighting devices typically include a main power switch, such as a button that may be pressed down by the user. Such lighting devices may also include additional electronics such as an electronic switch that may provide power to the LED or other light source, a microcontroller or microprocessor that is coupled to the electronic switch and that is programmed to close the electronic switch to provide power to and illuminate the LED or other light source according to the desired operating mode, e.g., dimmer for power save mode, and the dot/dot/dot-dash/dash/dash pattern for an SOS mode.

With such portable lighting devices such as a flashlight, the user may select the desired mode of operation from the user interface by manipulating the flashlight in certain manners. For example, the main power switch may be pressed and held down for a certain amount of time or pressed down a certain number of instances to select a different mode. As another example, the body of the flashlight may be rotated and/or pointed in a particular direction to select or vary a particular mode.

In such portable lighting devices, the user interface typically provides a certain number of pre-determined operating modes, and the user may manipulate the lighting device, e.g., by pressing on the main power switch in a particular manner, to select between these different modes. For example, where a portable lighting device such as a flashlight provides a full power mode, power save mode, blink or strobe mode, SOS mode, or momentary mode, the main power switch may be pressed down for a certain length of time or a certain number of instances to select any of these modes.

An issue that may exist with multi-mode portable electronic lighting devices of the type described above is that the operational modes provided by a particular user interface may not be desirable for every user. For example, typical consumers may prefer an SOS mode for safety purposes when seeking help. However, law enforcement users may prefer a "momentary" mode where the LED or other light source is illuminated only while the main power switch is pressed down and the light turns off when no longer pressed. This mode is useful where the law enforcement user wants to quickly turn the light on and off or wants it off if the flashlight is dropped (as opposed to turning the light on with a "latch" mode where the switch is "latched" into an "on" position, but then must be un-latched to turn the light off).

If the user interface provides an SOS mode but not a momentary mode, the lighting device may be favored more by consumers than law enforcement users. Conversely, if the user interface provides a momentary mode but not an SOS mode, the lighting device may be favored more by law enforcement users than consumers. Accordingly, because lighting devices such as flashlights are used for a variety of purposes and by a variety of people, including both ordinary consumers and law enforcement officers, a need exists for a portable lighting device, such as a flashlight, in which the user interface may be reconfigured so that different modes may be accessed by a user (or different users) according to a user's particular needs.

Another issue that may exist with the above-described multi-mode lighting devices arises where the different modes of operation provided by the user interface are arranged in a set sequence. Where this is the case, in order to select a certain mode, the user may need to index through all the modes that precede the desired mode. If a user interface provides a number of modes, it may become cumbersome for a particular user to index through a number of modes to arrive at the desired mode. This may be especially so where the modes most often used by the user are late in the sequence and/or are not next to each other in the sequence. In other words, the user interface may not be optimally designed for the user's pattern of use. Accordingly, a need exists for a portable lighting device in which the user interface may be selected, reconfigured, or changed, in order to provide the modes of operation optimally suited for the user's pattern of use. Another need exists for the user to be able to select a particular mode without having to index through the preceding modes of the given user interface.

Another issue may arise with certain multi-mode electronic portable lighting devices when the lighting device is dropped such that the batteries are temporarily dislodged and power is momentarily cut off. In certain multi-mode flashlights, this brief interruption in power may signal to the lighting device that a different mode has been selected. This may create a dangerous situation, for example, where the user needs constant light but the lighting device has switched to a blink or strobe mode. Accordingly, a need exists for a lighting device which may distinguish between intended and unintended power interruptions to avoid potentially dangerous situations. A need also exists for a lighting device in which different modes may be selected without the lighting device being turned off for an appreciable amount of time.

SUMMARY OF THE INVENTION

An object of the current invention is to provide a multi-mode portable electronic lighting device, such as a flashlight, that ameliorates or addresses one or more of the foregoing issues associated with prior art lighting devices.

In an aspect of the current invention, a multi-mode portable electronic lighting device that provides different user interfaces is described. In one embodiment, the multi-mode portable electronic lighting device may include several preset user interfaces for the user to choose between, with each user interface having a unique combination and sequence of operational modes. The user may choose among the user interfaces and set the desired interface as the operating user interface for the multi-mode portable electronic lighting device.

Another aspect of the present invention provides a multi-mode portable electronic lighting device that includes a means for allowing the user to directly select an operational mode without the need to index through the sequence of operational modes. In one embodiment, the multi-mode portable electronic lighting device comprises a button that the user can use to signal the desired operational mode. For example, pressing or clicking the button once would change the operating mode of the lighting device to the first operational mode of the user interface; pressing or clicking the button twice would change the operating mode to the second operational mode of the user interface; and so on. The user may press or click the button any number of times—thereby selecting any of the operational modes available under the operating user interface—regardless of the lighting device's then operating mode.

Another aspect of the current invention involves a switch module that may contain the electronics and capability associated with the current invention to provide the user with different user interfaces. This switch module may be used to replace existing mechanical or other types of switches in existing lighting devices, thereby providing a retrofitting capability, and providing such existing lighting devices with the reconfigurable user interface capability of the current invention.

Another aspect of the current invention involves the user being able to create his or her own customized user interfaces so that a user interface having the modes specifically desired by the user and in a preferred order may be obtained.

DETAILED DESCRIPTION OF THE PREFERRED EMBODIMENTS

Figure 1:
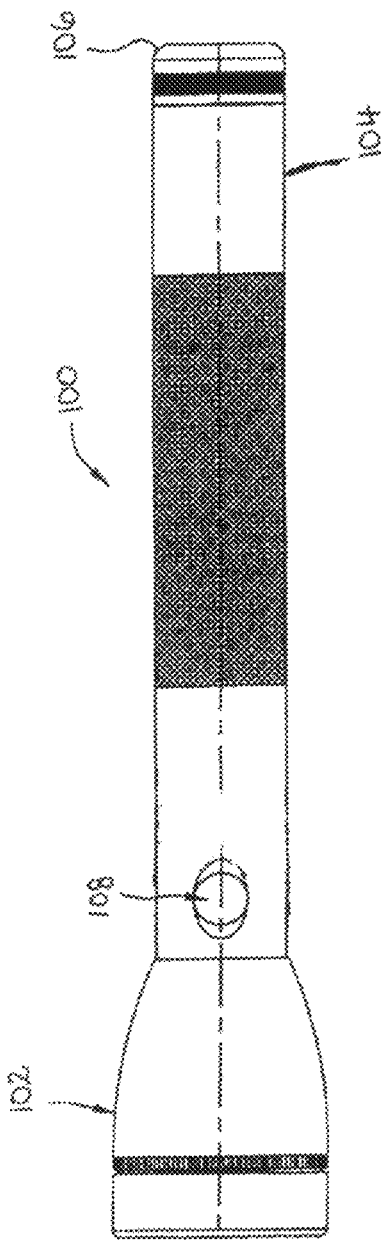
FIG. 1 is a side view of a flashlight.

Embodiments of the current invention will now be described with reference to the drawings. To facilitate the description, any reference numeral representing an element in one figure will represent the same element in any other figure. The current invention is not limited to the specific description below, as one skilled in the art will appreciate that variations may occur in the subject matter described below while still being within the scope and content of the current invention. The description below makes reference to flashlights, but one skilled in the art will recognize that the current invention is suitable for other types of portable lighting devices, handheld or otherwise.

A flashlight 100 contemplated by the current invention is now described with reference to the figures. As shown in FIG. 1, flashlight 100 may generally include a head 102, barrel 104, tail cap 106 and power switch 108. The flashlight may be a non-rechargeable flashlight or a rechargeable flashlight. If rechargeable, the flashlight may include external charging contacts (not shown) to recharge the power source, e.g., battery, when it is contained in the flashlight. However, the current invention is equally for use with non-rechargeable portable lighting devices or with rechargeable batteries which are recharged when removed from the lighting device.

Figure 2:
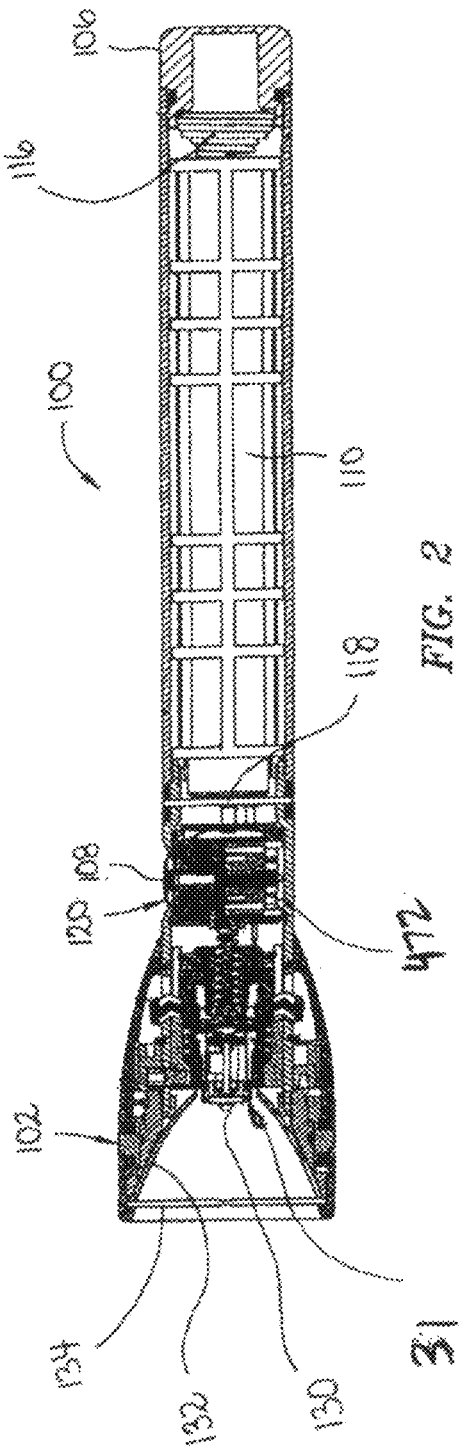
FIG. 2 is a section view of a flashlight

As shown in FIG. 2, flashlight 100 may also include battery or battery pack 110 housed in barrel 104. The battery may be non-rechargeable or rechargeable. One battery 110 or a plurality of batteries 110 may be used. Flashlight 100 may also include spring 116 which may be electrically coupled to the negative electrode of battery 110 and to tail cap 106. Flashlight 100 may also include positive contact 118 which may be electrically coupled to the positive electrode of battery or battery pack 110 and which may serve to provide power.

Flashlight 100 may also include switch module 120 that may contain electronics, such as assembled circuit board 472, to provide the reconfigurable interfaces of the current invention. Switch module 120 may also include power switch 108 which may be a mechanical or electronic press-button switch. In one application of the current invention, an electronic switch module 120 may be retrofitted into existing flashlights by replacing the mechanical type of switch contained in such existing flashlights.

As shown in FIG. 2, head 102 may include LED 130, though other types of light source may be used. Head 102 may also include reflector 132 and lens 134. As also shown in FIG. 2, other suitable mechanical and electrical components may be used to support LED 130, to provide an electrical path therethrough and to provide thermal coupling therefor. Such components are described in, for example, U.S. Pat. No. 7,579,782 and/or U.S. patent application Ser. Nos. 12/188,233, 12/353,965 and/or 12/657,290, the contents of which are all expressly incorporated by reference as though set forth herein. LED 130 may be included in a module 131 that may position LED 130, and provide electrical and/or thermal coupling, as described, for example, in U.S. patent application Ser. Nos. 10/922,714, 11/227,768 and/or 12/188,201, the contents of which are all expressly incorporated by reference as though set forth herein.

In the embodiment of flashlight 100 shown in FIGS. 1-2, the basic electrical circuit may be as follows. Battery 110 provides power through the positive contact 118 to the switch module 120. Electrical connections within switch module 120 provide an electrical path to the positive electrode of LED 130. Assembled circuit board 472 may form part of the electrical path through switch module 120. A light output is produced by LED 130 as power passes therethrough. After passing through LED 130, the electrical circuit passes through the negative electrode thereof to barrel 110, tail cap 106, spring 116 and back to the negative electrode of battery 110. The user may turn on flashlight 100 by pressing down switch 108. However, other types of electrical circuits may be used.

As discussed in more detail later, switch module 120 may include an electronic power switch, a microprocessor or microcontroller, memory and/or other electronics which may be used to store information pertaining to user interfaces and the operational modes provided thereby. These electronics may also be used to select between available user interfaces and operational modes as discussed below. In a preferred embodiment, these electronics may reside on assembled circuit board 472, though they may be located elsewhere. Electronics that may be used in connection with the current invention are described, for example, U.S. Pat. No. 7,579,782 and/or U.S. patent application Ser. Nos. 12/188,233, 12/353, 965 and/or 12/657,290, the contents of which are all expressly incorporated by reference as though set forth herein.

As used herein, the term "user interface" may generally refer to a menu, or a sequence, set or list of operational modes that may be provided by a portable lighting device to a user. The current invention is not limited to the particular operational modes and user interfaces described herein. Indeed, the scope of the invention extends to whatever operational modes and/or user interfaces that may be preferred to address a particular user's needs.

Different sets of operational modes and/or user interfaces may be desired by different types of users. Besides the standard or normal power mode, for example, users may desire various other modes such as a power save mode, a strobe mode, an SOS mode, a momentary mode or other modes. And within the set of modes provided by a portable lighting device, certain modes may be used more often than others. Accordingly, different types of users may desire different user interfaces, both in terms of the modes provided by the interface, as well as the order in which the modes are provided.

To accommodate the preferences of various users, flashlight 100 may provide several user interfaces, with each user interface having a unique combination and/or sequence of operational modes. In one embodiment of the current invention, flashlight 100 provides four user interfaces as set forth in the following table. As discussed below, two of the four user interfaces provide modes that may be typically preferred by consumers. These are identified as User Interfaces 1 and 2, or Consumer 1 and Consumer 2. The other two user interfaces provide modes that may be typically preferred by law enforcement officers. These are identified as User Interfaces 3 and 4, or Law Enforcement 1 and Law Enforcement 2.

TABLE 1

User Interfaces

| | Available User Interfaces | | | |
|---|---|---|---|---|
| | Interface 1 Consumer 1 (default) | Interface 2 Consumer 2 (optional) | Interface 3 Law Enforcement 1 (optional) | Interface 4 Law Enforcement 2 (optional) |
| First Operational Mode | On | On | Momentary | Momentary |
| Second Operational Mode | Power Save | Power Save | On | On |
| Third Operational Mode | Strobe | SOS | Power Save | Strobe |

As noted above, the current invention is not limited to these four user interfaces. To this end, flashlight 100 or other portable lighting device of the current invention may provide other user interfaces, with other sequences of operational modes, that may be intended for any set of users.

Interface 1 may be set as a default user interface so that flashlight 100 provides a user interface upon its initial use when taken from a package after purchase. As shown, Interface 1 may include operational modes that are desired by ordinary consumers, such as an on mode, a power save mode and a blink or strobe mode.

Interface 2 may contain modes desired by other ordinary consumers, i.e., an on mode, a power save mode and an SOS mode. Interface 3 may contain modes desired by certain law enforcement officers, i.e., a momentary mode, an on mode and a power save mode. Interface 4 may contain modes desired by other law enforcement officers, i.e., a momentary mode, an on mode and a blink or strobe mode.

User Interfaces 2, 3 and 4 may be referenced as optional and may be selected per the method described below. However, any of User Interfaces 2, 3 or 4 may be set as a default with User Interface 1 being optional.

As shown, each user interface provides a different choice of operational modes as well as a different sequence thereof. For example, if a consumer acquires flashlight 100, and he or she believes that a strobe mode would be of more use than an SOS mode, he or she may select Consumer Interface 1. Or if the user believes that he or she would use an SOS mode more often than a strobe mode, User Interface 2 (i.e., Consumer Interface 2) may be selected. Accordingly, the user's preferred modes of operation are readily available. As another example, if a law enforcement officer acquires flashlight 100, he or she may choose between Law Enforcement Interfaces 1 and 2 according to whether he or she believes a power save mode or a strobe mode would be more useful.

Any particular user can select any one of the four user interfaces provided. For example, it should be noted that a consumer may actually desire either of the law enforcement user interfaces, and that a law enforcement officer may desire either of the consumer user interfaces. Accordingly, the labels associated with the different user interfaces are not intended to be limiting in any way. Furthermore, each of the four user interfaces of the above table may provide additional and/or different modes of operation.

Additional user interfaces other than the four user interfaces may also be provided by flashlight 100 that contain operational modes that may be preferred by other groups of users, e.g., miners, farmers, outdoor guides, etc. And within these additional user interfaces, specific sets and sequences of modes may be provided.

The manner in which different user interfaces may be selected is now described. In one embodiment, the following steps may generally occur:

1. Interrupt power supply, e.g., loosen or remove the tail cap from the barrel, for more than a predetermined amount of time, e.g., a second or more;

2. Press and hold down the main power switch button;

3. Re-establish power supply, e.g., tighten or reattach the tail cap to the barrel while the main power switch button continues to be pressed;

4. Continue to hold down the button of the main power switch until a signal is generated, in the present embodiment, the signal is a certain number of blinks from the light source, wherein the number of blinks denotes a particular user interface; and 5. Release the button of the main power switch after the desired number of blinks (i.e., the desired user interface) is seen.

The method 200 of selecting a particular user interface is now described in more detail with reference to the flowchart of FIG. 3. Generally, if the user is satisfied with the type of operational modes set forth in the default user interface, any of the optional user interfaces need not be selected. But as shown, to select any of the optional user interfaces, the user may first interrupt the power supply. In a preferred embodiment, this may occur by loosening tail cap 106 by partially unscrewing it from barrel 104, or by removing tail cap 106, as shown in step 202. Tail cap 106 need only be loosened enough to open the main power circuit and disrupt the flow of power from battery 110. It may generally be easier for the user to only loosen tail cap 106 rather than remove it.

In this embodiment, tail cap loosening or removal is discussed because tail cap 106 forms part of the electrical circuit between the batteries and light source. Tail cap 106 is preferably loosened or removed for more than a predetermined amount of time so that the electronics of flashlight 100 recognize that a user interface is being selected, as opposed to there being a momentary disruption of the power source, such as when flashlight 100 is dropped causing the batteries to be displaced. Accordingly, the predetermined time period of step 202 is preferably longer than that associated with a momentary disruption of power. The disruption of power and the manner in which the electronics may handle this disruption are also discussed, for example, in U.S. patent application Ser. Nos. 12/188,233, 12/353,965 and/or 12/657,290, the contents of which are expressly incorporated by reference as though set forth herein. The predetermined time period of step 202 may vary.

In a preferred embodiment, the electronics of flashlight 100 may distinguish between there being a sufficiently long power interruption or not by, e.g., measuring the voltage of a capacitor in its circuitry. Where the voltage has not sufficiently decayed, the power interruption was not sufficiently long and the electronics may view the interruption as momentary or accidental such as when the flashlight is dropped. In this case, the existing user interface will not be changed. This may be important where, for example, the user is in a dangerous situation and needs continuous light, but drops the flashlight without intending to change the user interface.

Figure 3:
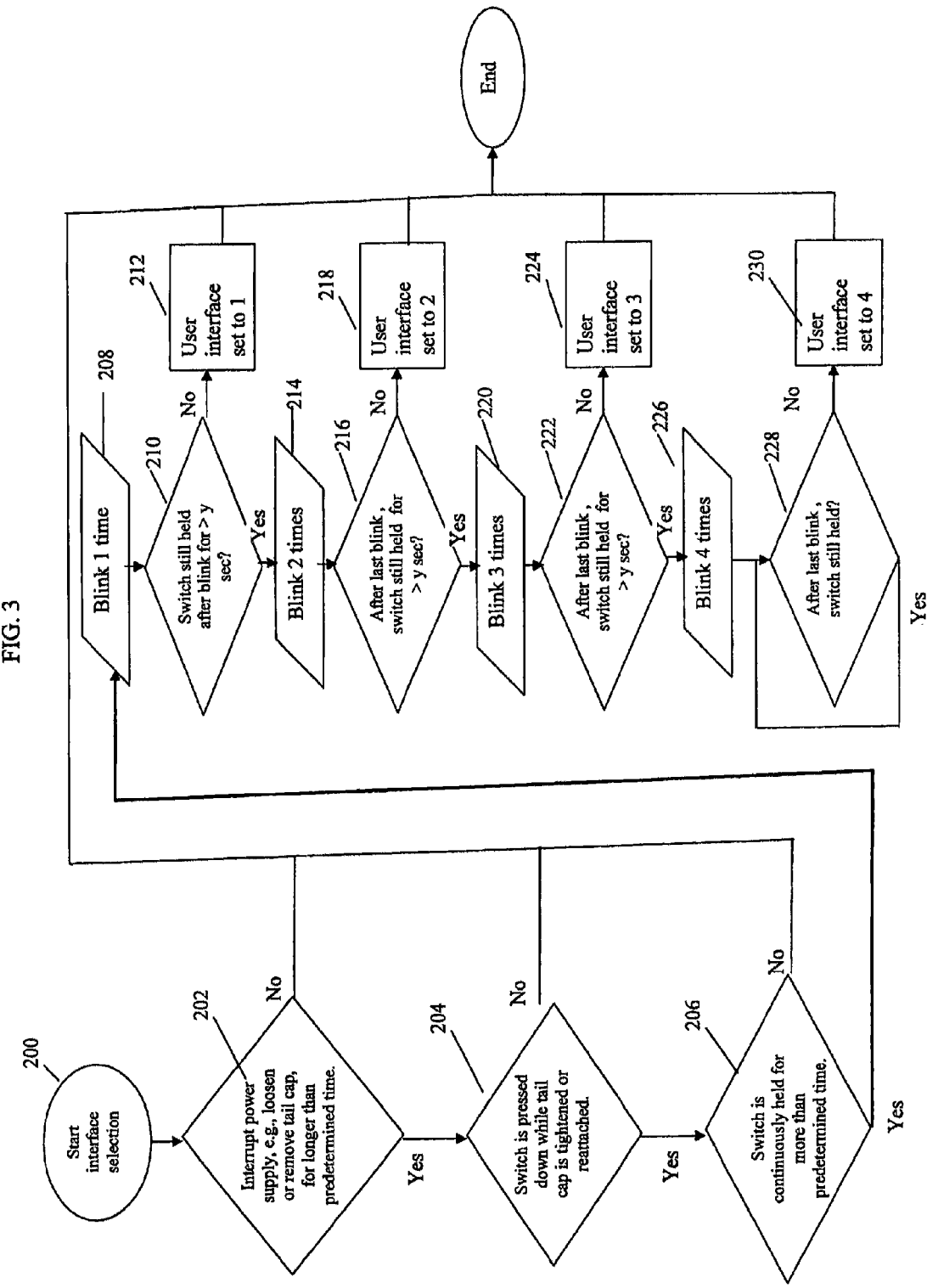
FIG. 3 is a flowchart showing a manner in which user interfaces may be changed or reconfigured in flashlights and other portable lighting devices.

In FIG. 3, an accidental or other short interruption of power is represented by the "no" decision in step 202. In this case, and as shown, no user interface selection occurs. Where the voltage has sufficiently decayed, however, the power interruption has been sufficiently long and the electronics may view the interruption as indicating that a new interface is being selected. In FIG. 3, this is represented by the "yes" decision in step 202.

In other types of portable lighting devices where the tail cap does not form part of the electrical circuit, the user may perform an alternate step to interrupt power from the batteries to signify to the electronics that a user interface is being selected.

As shown in step 202, if the tail cap is not loosened or removed (and thus the electrical circuit is not disrupted) for more than the predetermined time period, method 200 of selecting another user interface goes no further and another user interface is not selected. But if the tail cap has been loosened or removed for sufficiently long, as indicated by the "yes" decision in step 202, the next step 204 occurs.

Step 204 involves the user pressing down on power switch 108 prior to re-establishing the power supply, e.g., by tightening or reattaching tail cap 106, and continuing to press down on power switch 108 while tail cap 106 is tightened or reattached As shown in FIG. 3, if this does not occur, as represented by the "no" decision in step 204, another user interface will not be selected. But if the user performs this step, the "yes" decision in step 204 occurs. In general, it may be easier for the user to only partially unscrew tail cap 106 enough to disrupt the main power circuit so that the user need only screw tail cap 106 a little to tighten it to barrel 104 (as opposed to joining a separate tail cap 106 to barrel 104).

At this point, if the user continues to hold down the power switch for more than a predetermined amount of time after the tail cap has been reattached, as represented by the "yes" decision in step 206, another user interface may be selected. The predetermined amount of time in step 206 may be about 2 seconds, though other periods of time may be used. In one embodiment, it is preferred that the predetermined amount of time be sufficiently long for the electronics of flashlight 100, e.g., microcontroller, to power up so as to be capable of executing commands to allow the user to select an interface.

Where the user has continued to press down on power switch 108 after tail cap 106 has been tightened or reattached, the light will blink one time, then two times, then three times and then four times. Each number of blinks may be associated with a particular user interface. A predetermined amount of time may transpire before the first blink, as well as between each set of blink(s). The predetermined amount of time may vary.

As shown in FIG. 3, after the user has pressed down the power switch sufficiently long as in step 206, the light may blink one time as shown in step 208. If the user releases the power switch after that one blink (or does not continue to hold down the switch for more than a predetermined amount of time) as shown by the "no" decision of step 210, User Interface 1 will be selected as shown in step 212. In the embodiment of FIG. 3, this would be User Interface 1 or Consumer 1.

If the user continues to hold down the power switch for more than the predetermined amount of time, as shown by the "yes" decision in step 210, the light will blink twice as shown in step 214. If the user releases the power switch after the two blinks (or does not continue to hold down the switch for more than a predetermined amount of time) as shown by the "no" decision in step 216, User Interface 2 will be selected as shown in step 218. In the embodiment of FIG. 3, this would be User Interface 2 or Consumer 2.

If the user continues to hold down the power switch for more than the predetermined amount of time, as shown by the "yes" decision in step 216, the light will blink three times as shown in step 220. If the user releases the switch after the three blinks (or does not continue to hold down the switch for more than a predetermined amount of time) as shown by the "no" decision in step 222, User Interface 3 will be selected as shown in step 224. In the embodiment of FIG. 3, this would be User Interface 3 or Law Enforcement 1.

If the user continues to hold down the power switch for more than the predetermined amount of time, as shown by the "yes" decision in step 222, the light will blink four times as shown in step 226. If the user releases the switch after the four blinks (or does not continue to hold down the switch for more than a predetermined amount of time) as shown by the "no" decision in step 228, User Interface 4 will be selected as shown in step 230. In the embodiment of FIG. 3, this would be User Interface 4 or Law Enforcement 2.

If the user continues to hold down power switch 108 for more than the predetermined amount of time, as shown by the "yes" decision in step 228, the user may again be presented with the choice of selecting User Interface 4. Alternatively, the electronics of flashlight 100 may revert to the top of the interface choices and blink once. The same steps may then occur. Alternatively, the electronics of flashlight 100 may end the method of FIG. 3 wherein no different user interface is selected. In this case, the user may need to restart method 200 by again interrupting the power supply by, e.g., loosening or removing tail cap 106 as in step 202.

Once a user interface is selected, the different modes comprising that interface are available to the user. To select between the modes of a given user interface, the user may click power switch 108 a certain number of times to select each mode. In a preferred embodiment, the user may select operational modes by quickly clicking the power switch. For example, if the user has selected Interface 1, the user may click once to access the on mode, i.e., turn the flashlight on. Alternatively, the user may click the switch twice and access the power save mode. Alternatively, the user may click the switch three times and access the strobe mode. This provides the benefit that the user may proceed directly to the desired mode and need not index through each operating mode preceding the desired operating mode.

In a preferred embodiment, if flashlight 100 is in a particular mode, and the user desires to select another mode, the user may turn off flashlight 100 briefly. The user may then select the new mode by clicking power switch 108 the appropriate number of times.

If User Interface 1 included more than three modes, the user could alternatively click the switch four times to access the fourth available mode, and so on. As indicated above, the current invention is not limited to user interfaces having only three modes.

It is preferred that the user interfaces and the operational modes they provide may be programmed into the flashlight or other portable lighting device of the current invention through software. In this manner, the electrical circuits and other hardware of the lighting device need not be changed to provide different user interfaces. For example, in the example discussed above, five different operating modes, i.e., on, power save, SOS, momentary and strobe, may be programmed into a microcontroller contained in the electronics. This may occur as the different user interfaces are programmed into microcontroller 720. And when the user selects any of the modes by choosing a user interface and then selecting the mode within that user interface, the microcontroller may provide signals to power the LED or other light source accordingly. Additional modes may also be programmed into the microcontroller so that other command signals associated with those modes may be provided by the microcontroller.

In a preferred embodiment, the user interfaces and the modes provided by each interface may programmed into and stored by memory embedded in a microcontroller or microprocessor. For example, the interfaces and modes may be stored by embedded EEPROM or in self-writable flash memory. This programming may occur during manufacture of flashlight 100 or other portable lighting device, or thereafter. The use of this type of memory and accessing of information from memory is discussed, for example, U.S. Pat. No. 7,579,782 and/or U.S. patent application Ser. Nos. 12/188,233, 12/353,965 and/or 12/657,290, the contents of which are all expressly incorporated by reference as though set forth herein.

The electronics and programming associated with the current invention will now be further described with reference to FIGS. 4-7. As mentioned earlier, switch module 120 may include electronics such as assembled circuit board 472. Various electronics may reside on assembled circuit board 472 or elsewhere. Assembled circuit board 472 is described in connection with flashlight 100. However, it is to be understood that assembled circuit board 472 as well as switch module 120 may also be used in other flashlights or other portable lighting devices.

Figure 4:
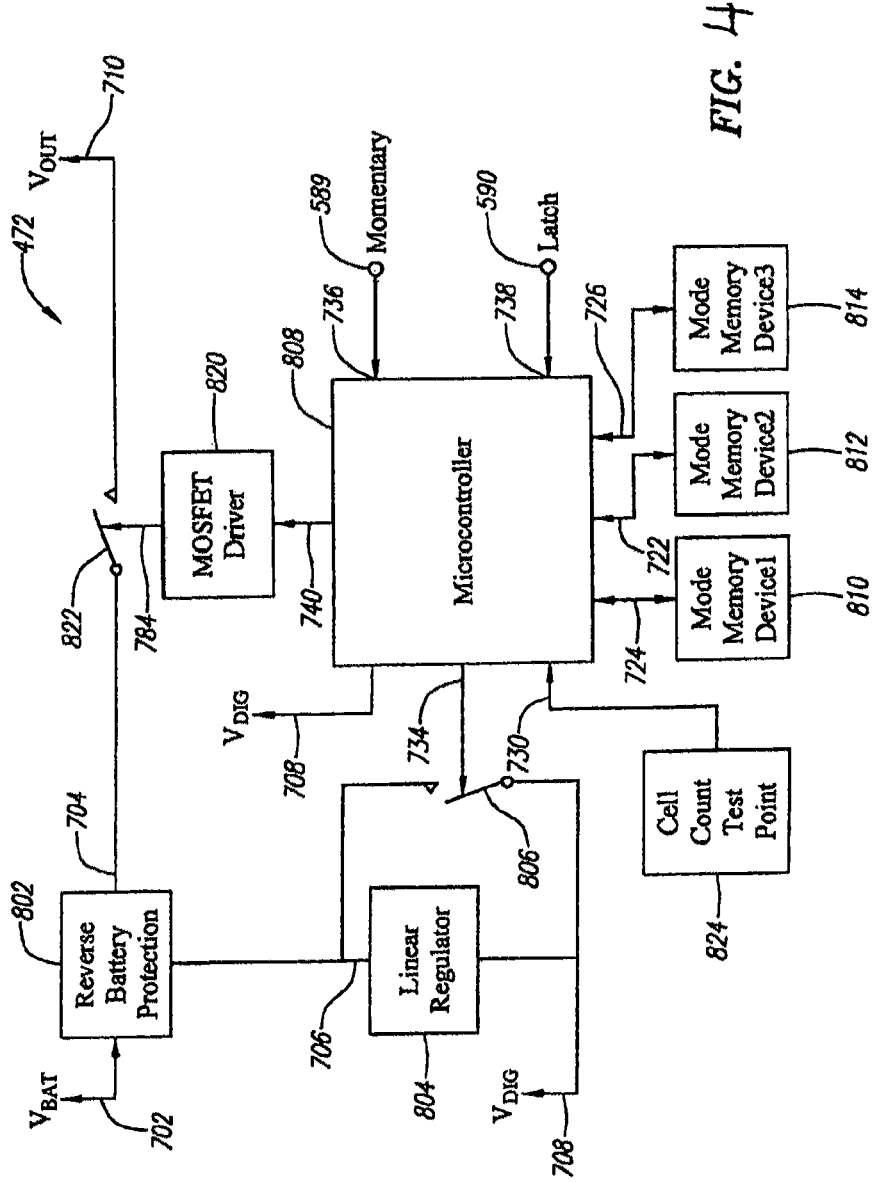
FIG. 4 is a circuit diagram illustrating the relationship of electronic circuitry according to an embodiment of the invention.

FIG. 4 is a block diagram illustrating the relationship of the electronic circuitry of assembled circuit board 472. In the embodiment of FIG. 4, assembled circuit board 472 includes microcontroller circuit 808, reverse battery protection circuit 802, linear regulator circuit 804, first mode memory device 810, second mode memory device 812, third mode memory device 814, bypass switch 806, MOSFET driver 820, electric load switch 822, momentary pad 589, latch pad 590, and cell count test point 824.

As discussed later, mode memory devices 810, 812, 814 may be used to store or provide certain information about the operation of flashlight 100. For example, mode memory device 810 may provide information regarding whether the power supply has been interrupted, e.g., by tail cap 106 being loosened or removed, sufficiently long (as in step 202 of FIG. 3) so as to proceed with reconfiguring the user interface. Devices 812, 814 may be used to store information reflecting the current operational mode so that flashlight 100 may return to that current mode after a momentary loss of power as may occur when, e.g., flashlight 100 is dropped.

Reverse battery protection circuit 802, linear regulating circuit 804 and cell count test point 824 are not discussed further herein. Their structure and function, as well as other aspects of assembled circuit board 472, are further described in U.S. patent application Ser. Nos. 12/188,233 and 12/353,965, the contents of which are all expressly incorporated by reference as though set forth herein. But in general, reverse battery protection circuit 802 may receive voltage 702 from the positive contact 118 from battery pack or other power source 110, and may also be coupled to internal voltage supply 704. With reverse battery protection circuit 802, when the battery or battery pack is installed in reverse order, no current will flow through current paths of the flashlight. Linear regulator circuit 804, which may be coupled to internal voltage supply 706, may be used to regulate the amount of power supplied to microcontroller 720. Cell count test point 824 may be used to input information to microcontroller 720 regarding the power source 110 to be used in flashlight 100 or other portable lighting device of the current invention.

Figure 5:
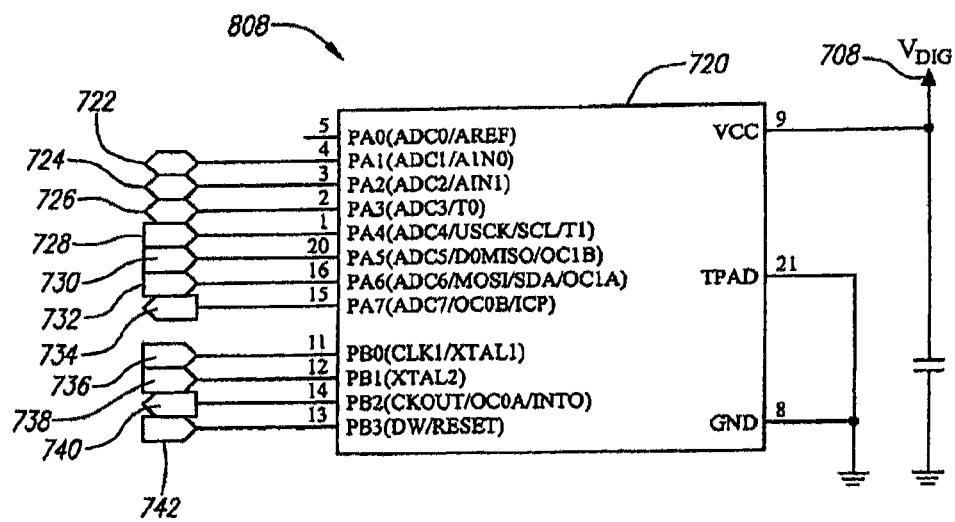
FIG. 5 depicts a microcontroller.

Referring to FIG. 5, microcontroller circuit 808 includes a microcontroller 720 and connections. Microcontroller 720 may receive input signals through signal lines ADC_MODE_CAP1 722, ADC_MODE_CAP2 724, ADC_MODE_CAP3 726, MISO 730, MOMENTARY SWITCH 736, MAIN_SWITCH 738, and RESET 742. Microcontroller 720 also delivers output signals through signal lines ADC_MODE_CAP1 722, ADC—MODE—CAP2 724, ADC_MODE_CAP3 726, BYPASS—LDO 734, and LAMP—DRIVE 740. Accordingly, signal lines ADC_MODE_CAP1 722, ADC_MODE_CAP2 724, ADC_MODE_CAP3 726 are bi-directional.

In one embodiment, microcontroller 720 may be a commercial microcontroller having embedded memory, such as, for example, ATtiny24 which is an 8-bit microcontroller manufactured by Atmel Corporation of San Jose, Calif. Microcontrollers such as ATtiny24 and ATtiny84, which have more flash memory, may also be used. In another embodiment, microcontroller 720 may be a microprocessor. Yet in other embodiments, microcontroller 720 may comprise discrete circuits. The structure and function of microcontroller 720 are further discussed in U.S. patent application Ser. Nos. 12/188,233 and 12/353,965, the contents of which are all expressly incorporated by reference as though set forth herein.

While flashlight 100 (or other portable lighting device) is assembled, e.g., tail cap 106 is not loosened or removed and power source 110 is providing power, microcontroller 720 preferably receives power from power source 110 regardless of whether the power switch 108 is closed and flashlight 100 is turned "on." But as discussed later, when tail cap 106 is loosened or removed, or when the portable lighting device is otherwise disassembled, so that power source 110 is not electrically coupled to the electronics, microcontroller 720 and the electronics on assembled circuit board 472 will not be powered for a sufficiently long time so that residual stored voltages decay. Information regarding decayed voltage, e.g., zero voltage, may be used to proceed with the user interface reconfiguration algorithm.

Microcontroller 720 may be programmed during manufacture of flashlight 100, or other portable lighting device, to input various information such as the different user interfaces and operational modes as discussed above. Various computer programs may be used to create microcontroller commands to provide the desired modes and interfaces. The code thus written may then be compiled and downloaded to microcontroller 720. In a preferred embodiment, the software may be downloaded through inputs 728, 732 of microcontroller 720 (FIG. 5). This information is also preferably stored in an embedded non-volatile memory, such as EEPROM or self-writable flash memory, of microcontroller 720 so that commands regarding the power to be provided to LED 130 to effect different operational modes are saved.

Figure 6:
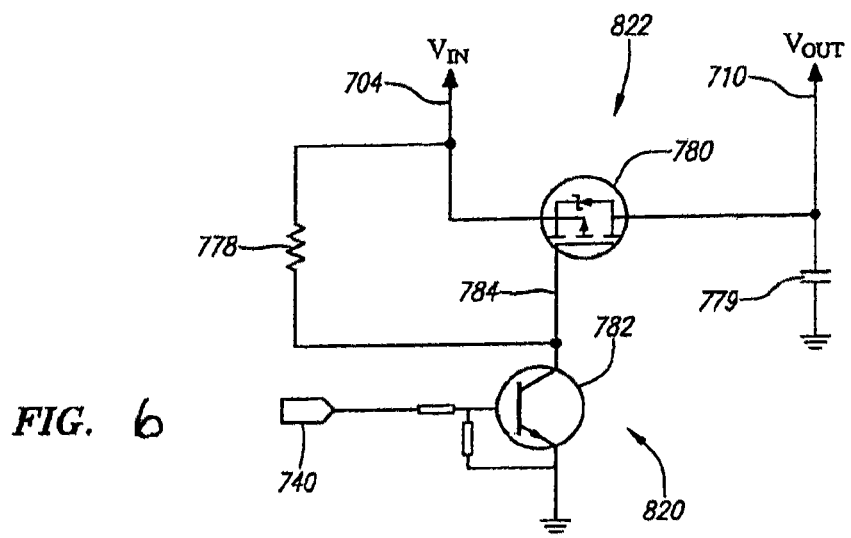
FIG. 6 depicts a MOSFET driver circuit.

FIG. 6 shows a circuit schematic diagram of MOSFET driver circuit 820 and a load switch 822. The structure and function of circuit 820 and load switch 822 are further discussed in U.S. patent application Ser. Nos. 12/188,233 and 12/353,965, the contents of which are all expressly incorporated as though set forth herein. In the embodiment of FIG. 6, electronic load switch 822 comprises PMOS 780. The source of PMOS 780 is coupled to internal voltage supply 704 while the drain of PMOS 780 is coupled to voltage output pin 710. Voltage output pin 710 may be coupled to the positive electrode of the LED 130 of flashlight 100. The gate of PMOS 780 is coupled through line 784 to a MOSFET driver 820, which is implemented by a bipolar transistor 782. The gate of PMOS 780 is also pulled-up to internal voltage supply 704 by a resistor 778. Accordingly, when the base of bipolar transistor 782 is driven high by signal LAMP_DRIVE 740, bipolar transistor 782 is closed and begins to conduct, which in turn causes PMOS 780 to close and conduct. Therefore, electric power can flow from internal voltage supply 704 to voltage output pin 710 thereby completing the circuit to power LED 130. Capacitor 779 may also be included as shown.

With the switch assembly design described above, as long as power source 110 is installed and electrically coupled to switch module 120, assembled circuit board 472 will be supported by power from power source 110 regardless whether the flashlight 100 is turned "on" or turned "off." By default, microcontroller 720 is preferably in a very low power stand-by mode to minimize drain on the batteries. When power switch 108 is pressed down thereby turning "on" flashlight 100 by closing the circuit, microcontroller 720 wakes up from the low power stand-by mode and turns on to close the load switch 780, which in turn powers LED 130 of flashlight 100. As long as power switch 108 is pressed down thereby closing the circuit, LED 130 may be powered. Once power switch 108 is released, microcontroller 720 will turn "off" load switch 780 and power to LED 130 will be cut off. Microcontroller 720 will then go back to low power stand-by mode.

Figure 7:
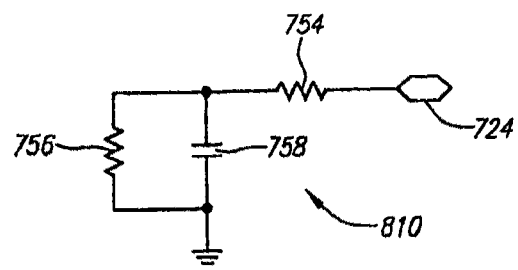
FIG. 7 depicts memory circuitry.
Figure 7:
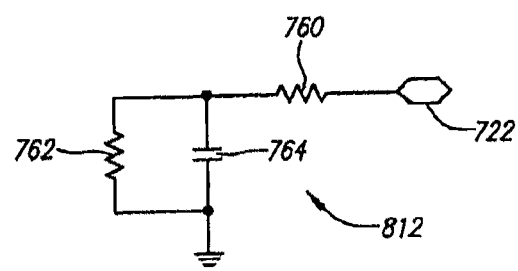
Figure 7:
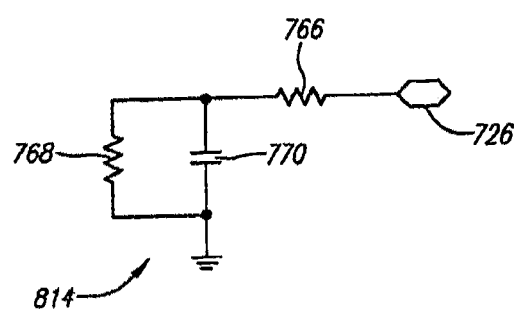

Referring to FIG. 7, the three mode memory devices 810, 812, 814 will now be described. The first mode memory device 810 has an input/output signal line ADC_MODE_CAP2 724 which is coupled to microcontroller 720. Signal line ADC_MODE_CAP2 is also coupled to one end of a charge resistor 754. The other end of resistor 754 is coupled to an RC circuit comprising a bleed off resistor 756 connected in parallel with a capacitor 758. The other end of the RC circuit is coupled to ground. This first mode memory device 810 may be used to store information in a temporary manner. Microcontroller 720 may be used to store information in mode memory device 810 by setting signal line ADC_MODE_CAP2 724 to a high or a low signal. The high signal would be stored in the first mode memory device 810 for a short period of time, for example, 2 seconds, before it is decayed sufficiently that it is no longer recognized as a high signal. Microcontroller 720 can execute a read operation from signal line ADC_MODE_CAP2 724 to retrieve data stored in the first mode memory device 810. In one embodiment, the resistance of resistor 756 is 1.0 Mega Ohms while the capacitance of capacitor 758 is 1.0 micro Farad. As shown in FIG. 7, memory mode devices 812, 814 may have the same configuration. Memory mode device 812 may comprise input/output signal line 722, charge resistor 760 and an RC circuit comprising bleed off resistor 762 and capacitor 764. Memory mode device 814 may comprise input/output signal line 726, charge resistor 766 and an RC circuit comprising bleed off resistor 768 and capacitor 770.

Memory device 810 may be used in connection with step 202 of FIG. 3. That is, capacitor 758 may store a certain voltage when tail cap 106 is assembled and power is provided to the electronics including memory mode device 810. Once tail cap 106 is loosened or removed and power from power source 110 is discontinued, the voltage stored by capacitor 758 will decay. If tail cap 106 is removed for longer than a certain period of time as in step 202, the voltage stored by capacitor 758 will sufficiently decay, e.g., go to zero. Information reflecting the voltage stored on capacitor 758, which may be zero or sufficiently small to indicate decay, may be read by microcontroller 720 to indicate that the main power circuit including power source 110 has been opened sufficiently long. This in turn indicates that the user may want to change the user interface and allows the user interface reconfiguration algorithm of FIG. 3 to proceed. (The user may then perform steps 204 and 206 to do so.)

In contrast, if the main power circuit is opened for only a short time, such as when flashlight 100 may be dropped, the voltage decay on capacitor 758 will be sufficiently small. This, in turn, will not indicate to microcontroller 720 that a user interface reconfiguration is intended (as represented by the "no" decision in step 202 of FIG. 3).

Expressed digitally, for a preferred embodiment as discussed above, if the information in memory device 810 is 0, this indicates that power has been discontinued for sufficiently long, which in turn allows the algorithm providing for user interface reconfiguration to proceed. On the other hand, if the information in memory device 810 is 1, this indicates that power was only briefly discontinued (as may occur with a dropped flashlight) and the user interface reconfiguration algorithm does not proceed.

As noted earlier, reconfiguring the user interface reconfiguration per the current invention is not limited so as to require the step of loosening or removing tail cap 106 for a sufficiently long time. Alternatively, power may be discontinued to the electronics, and the voltage stored by capacitor 758 may be caused to decay, by other types of power interruption. For example, power may be discontinued by pressing down on another switch (not shown) on the portable lighting device, which switch serves to open the main power circuit. As another example, another component that forms part of the main power circuit may be loosened or removed.

The operation of the electronics such as shown in FIG. 4, and how those electronics effect the algorithm shown in FIG. 3 is now further described. As indicated with reference to FIG. 3, if the user has held down power switch 108 while tail cap 106 has been tightened or replaced (step 204), and the user continues to hold down power switch 108 sufficiently long (step 206), LED 130 will start blinking. The blinking may occur after a predetermined length of time.

In FIG. 4, the user pressing down on power switch 108 is represented by power being provided by power supply source 708 and the closing of switch 806. Accordingly, microcontroller 720 may read whether switch 806 was closed while tail cap 106 was tightened or replaced (step 204) and whether switch 806 was closed thereafter for a sufficiently long amount of time (step 206).

In addition to powering the flashlight according to the mode of operation, microcontroller 720 may also store the current mode information to external mode memory devices 812, 814. This may occur by microcontroller 720 writing the current mode information into the mode memory devices 812, 814 by pulling signal lines ADC_MODE_CAP3 726 and ADC_MODE_CAP1 722 to either low or high, i.e., 0 or 1, depending on the current mode of operation. In this manner, the current mode information is stored and may be used so that flashlight 100 may resume operation in the current mode when power is restored after a momentary disruption.

The other memory mode devices 812, 814 are now further described. Second mode memory device 812 and the third mode memory device 814 may have the same configuration as that of the first mode memory device 810. Other configurations may also be used. Memory mode devices 812, 814 may store information reflecting the current mode of operation. This is advantageous where, for example, there is a momentary loss of power such as may occur when flashlight 100 is dropped. Where the current mode information is stored, however, when power is restored, the mode information stored in memory devices 812, 814 may be read by microcontroller 720 so that commands may be provided to provide power to LED 130 to resume operation in the same mode.

Flashlight 100 may be provided with a variety of modes of operation. In the preferred embodiment discussed above, controller 808 is configured to implement five separate modes of operation, i.e., on, power save, strobe, momentary and SOS in four different user interfaces. Different and/or additional modes may be stored on microcontroller 720. Accordingly, when the flashlight is switched on, microcontroller 720 reads mode information from an internal memory, for example, an embedded SRAM built in the microcontroller 720, and provides commands so that power is provided to LED 130 according to the operation mode.

In addition to powering the flashlight according to the mode of operation, microcontroller 720 may also store the current mode information to external mode memory devices 812, 814. This may occur by microcontroller 720 writing the current mode information into the mode memory devices 812, 814 by pulling signal lines ADC_MODE_CAP3 726 and ADC_MODE_CAP2 722 to either low or high, i.e., 0 or 1, depending on the current mode of operation. In this manner, the current mode information is stored and may be used so that flashlight 100 may resume operation in the current mode when power is restored after a momentary disruption.

Below are tables which show the combination of (low and high) information stored by memory devices 812, 814 for the operational modes in each user interface. If additional modes are to be included, additional memory devices may be included in the electronics.

TABLE 2a

Operation Modes and Code - Consumer 1

| Mode Name | Memory Device 812 | Memory Device 814 |
|---|---|---|
| Off | 0 | 0 |
| On | 1 | 0 |
| Power Save | 0 | 1 |
| Strobe | 1 | 1 |

TABLE 2b

Operation Modes and Code - Consumer 2

| Mode Name | Memory Device 812 | Memory Device 814 |
|---|---|---|
| Off | 0 | 0 |
| On | 1 | 0 |
| Power Save | 0 | 1 |
| SOS | 1 | 1 |

TABLE 2c

Operation Mode and Code - Law Enforcement 1

| Mode Name | Memory Device 812 | Memory Device 814 |
|---|---|---|
| Off | 0 | 0 |
| Momentary | 1 | 0 |
| On | 0 | 1 |
| Power Save | 1 | 1 |

TABLE 2d

Operation Mode and Code - Law Enforcement 2

| Mode Name | Memory Device 812 | Memory Device 814 |
|---|---|---|
| Off | 0 | 0 |
| Momentary | 1 | 0 |
| On | 0 | 1 |
| Strobe | 1 | 1 |

Flashlight 100 may face a power interruption while flashlight 100 is turned on or turned off. For example, when there is a need for battery replacement, flashlight 100 (and also the microcontroller 720) could experience a relatively long period of power interruption. When the flashlight is accidentally dropped on the ground or hit against a hard surface from one of its ends, the inertia of the batteries or battery pack could cause the batteries or battery pack which is sufficient to disconnect from one of the battery contacts for a short period of time, which is sufficient to cause a short period of power interruption to the controller 808.

In the present embodiment, after flashlight 100 has experienced a power interruption, no matter if it is a relatively long period or a short period, when the power is turned back on, microcontroller 720 may run a power up routine, which includes reading from the voltages stored on mode memory devices 812, 814 through signal lines ADC_MODE_CAP3 726, ADC_MODE_CAP1 722. Accordingly, flashlight 100 enters the mode indicated by the mode memory devices 812, 814.

For example, after a battery replacement, the mode information indicated by the mode memory devices 812, 814 should be 0, 0 since the charge stored on each of capacitors 764, 770 should have decayed by the time microcontroller 720 is again powered. Microcontroller 720 then reads from the mode memory devices 812, 814 and obtains 0, 0 as the mode information. Accordingly, flashlight 100 enters the off mode.

On the other hand, if flashlight 100 is accidentally dropped on the ground or is hit against a hard surface from one of its ends, the inertia of the batteries or battery pack could cause the batteries or battery pack to disconnect from one of the battery contacts for a short period of time, which is sufficient to cause a short period of power interruption of typically shorter than 0.5 seconds to the controller 808. If the mode of operation right before the power interruption was, for example, the strobe mode, the charge, after the short power interruption, stored on each of capacitors 764, 770 would continue to be retained until sufficiently after power is restored that microcontroller 720 will read 1, 1 when it reads from the mode memory devices 812, 814. Accordingly, flashlight 100 will enter the strobe mode, which was the operating mode before the power interruption. In other words, flashlight 100 preferably has immunity from such temporary power interruptions, due to accidental droppings of the flashlight or otherwise.

The power immunity from interruption of flashlight 100 also applies to the condition when flashlight 100 is in the off mode. When flashlight 100 is switched off, microcontroller 720 writes 0, 0 to mode memory devices 812, 814, and microcontroller 720 enters a low power stand-by mode. Therefore, regardless of whether a short power interruption or a long power interruption is experienced, after the power is restored, microcontroller 720 will read from the mode memory devices 812, 814 and obtain 0, 0 as the previous mode information. Accordingly, flashlight 100 will enter the off mode.

In a preferred embodiment, the user may also create the user interfaces to be provided by the flashlight or other portable lighting device. To this end, the user may select different operational modes and arrange them in different sets which each set comprising a different user interface. One manner in which this may be accomplished involves a flashlight which may be connected to a computer via a USB or other appropriate connection. After the flashlight is connected to the computer, the user may use the computer to store different operational modes in different user interfaces in the electronics of the flashlight.

For example, the electronics of switch module 120 may be used to display the operational modes that may be provided by flashlight 100 on the computer screen. The user may then select whatever mode he or she desires and place it into a file representing a particular user interface. This may be accomplished, for example, by dragging icons, which each icon represents an operational mode, into a section appearing on the computer screen that represents the user interface. The operational modes may be arranged in the desired order. When the user is finished selecting the operational modes to complete a particular user interface, that information may then be saved and stored into the memory or other electronics of switch module 120. The user may then select that user interface later on when using flashlight 100.

While various embodiments of a portable lighting device with reconfigurable interfaces and operational modes have been presented in the foregoing disclosure, numerous modifications, alterations and alternate embodiments may be contemplated by those skilled in the art and may be utilized in accomplishing the various aspects of the present invention. Thus, it is to be clearly understood that this description is made only by way of example and not as a limitation on the scope of the invention as claimed below.

What is claimed is:

1. A portable lighting device, comprising:
    a power source, a light source and electronics electrically coupled to form a circuit;
    a power switch that is electrically coupled to the circuit when engaged by a user; and
    one or more user interfaces that are each associated with a number of blink(s) of the light source;
    wherein the electronics are configured to provide power to the light source to emit a number of blink(s) when a user engages the power switch while the circuit is closed and to select the desired user interface when the user disengages the power switch after a certain number of blink(s).

2. The portable lighting device of claim 1, wherein the electronics are further configured to acknowledge one or more engagements of the power switch by the user, after the user interface has been selected, to select an operational mode provided by the user interface.

3. The portable lighting device of claim 1, wherein the portable lighting device is a flashlight.

4. The portable lighting device of claim 3, further comprising:
    a barrel for housing the power source; and p1 a tail cap that is coupled to the barrel, that forms part of the circuit and that is removable from the barrel to create the opening of the circuit.

5. The portable lighting device of claim 1, wherein the electronics include memory, and the one or more user interfaces are stored in the memory.

6. The portable lighting device of claim 1, wherein the electronics are configured to acknowledge the opening of the circuit lasting more than one second.

7. The portable lighting device of claim 1, wherein the electronics are configured to acknowledge the user engaging the power switch for more than two seconds after the circuit is closed.

8. The portable lighting device of claim 1, wherein the electronics are further configured to provide power to the light source to emit a single blink, two blinks, three blinks or four blinks, and each set of blink(s) are associated with a different user interface.

9. The portable lighting device of claim 8, wherein the different user interfaces each provides a unique set of operational modes.

10. A method of reconfiguring a user interface of a portable lighting device that includes a power source, a light source and electronics electrically coupled to form a circuit, and a power switch that is electrically coupled to the circuit when engaged by a user, the method, comprising:
    opening the circuit;
    engaging the power switch;
    closing the circuit;
    observing a number of blink(s) emitted by the light source, wherein each number of blink(s) is associated with a user interface; and
    releasing the power switch after viewing the number of blink(s) that is associated with the desired user interface, thereby selecting the desired user interface.

11. The method of claim 10, further comprising:
    selecting a desired operation mode by engaging the power switch one or more times after the desired user interface is selected.

12. The method of claim 10, wherein the portable lighting device is a flashlight.

13. The method of claim 12, wherein the opening the circuit step is accomplished by removing a tail cap of the flashlight.

14. The method of claim 13, wherein the power switch is engaged for more than two seconds after the tail cap is reattached.

15. The method of claim 12, wherein the tail cap is removed for more than one second.

16. A flashlight capable of providing different user interfaces to a user, comprising:
a power source, a light source and electronics electrically coupled to form a circuit, a power switch that is electrically coupled to the circuit when engaged by the user; and
one or more user interfaces that are stored in memory contained in the electronics and that are each associated with a number of blink(s) of the light source;
wherein the electronics are configured to provide power to the light source to emit a number of blink(s) when a user engages the power switch while the circuit is closed and to select the desired user interface when the user disengages the power switch after a certain number of blink(s).

17. The flashlight of claim 16, wherein the electronics are further configured to acknowledge, after the user interface is selected, one or more engagements of the power switch by the user to select an operational mode provided by the user interface.

18. The flashlight of claim 17, further comprising:
a barrel for housing the power source; and
a tail cap that is coupled to the barrel, that forms part of the circuit and that is removable from the barrel to create the opening of the circuit.

19. The flashlight of claim 16, wherein the electronics are further configured to acknowledge the opening of the circuit lasting more than one second, to acknowledge the user engaging the power switch for more than two second after the circuit is closed and to provide power to the light source to emit a single blink, two blinks, three blinks or four blinks.

20. A flashlight, comprising:
a power source, a light source and a controller electrically coupled to form a circuit,
a power switch that is electrically coupled to the circuit when engaged by a user; and
one or more user interfaces stored in the controller that are each associated with a number of blink(s) of the light source;
wherein the controller is configured to read information reflecting an opening of the circuit, to read information reflecting a user engaging the power switch while the circuit is closed, to provide power to the light source to emit a number of blink(s) and to acknowledge when the user disengages the power switch after a certain number of blink(s).

21. The flashlight of claim 20, wherein the controller is further configured to acknowledge one or more engagements of the power switch which are each associated with an operational mode, and to provide power to the light source according to the operational mode selected by the user.

22. The flashlight of claim 20, further comprising:
a barrel for housing the power source; and
a tail cap that is coupled to the barrel, that forms part of the circuit and that is removable from the barrel to create the opening of the circuit.

23. The flashlight of claim 20, further comprising:
a memory device that is coupled to the controller and that provides information readable by the controller reflecting that the opening of the circuit has occurred for longer than a predetermined time.

24. The flashlight of claim 23, wherein the information is a voltage.

25. The flashlight of claim 20, further comprising:
one or more memory devices that are coupled to the controller and that store information reflecting a current mode of operation.

26. The flashlight of claim 25, wherein the controller writes the information reflecting the current mode of operation to the one or more memory devices.

27. The flashlight of claim 20, wherein multiple modes of operation are stored in the controller.

28. A portable lighting device, comprising:
a power source, a light source for producing a light output and an electrical circuit to couple the power source and the light source;
a switch to open and close the electrical circuit;
a plurality of programmed modes providing different light outputs from the light source, the modes arranged in a predetermined operable sequence; and
electronics to control and access the modes manually operable by a device user to change the sequence of the modes.

29. The portable lighting device of claim 28, wherein the electronics are configured to provide power to emit a signal while the device user engages the switch while the electrical circuit is closed and to change the sequence of modes when the user disengages the switch after the signal is emitted.

30. The portable lighting device of claim 29, wherein the signal comprises blinks emitted from said light source.

31. The portable lighting device of claim 29, wherein the electronics are further configured to acknowledge one or more engagements of the switch by the user, after the sequence of the modes has been changed, to select a programmed mode provided by the sequence.

32. The portable lighting device of claim 28, wherein the portable lighting device is a flashlight.

33. The portable lighting device of claim 31, further comprising:
a barrel for housing the power source;
a tail cap that is coupled to the barrel, that forms part of the electrical circuit and that is removable from the barrel to open the electrical circuit.

34. The portable lighting device of claim 28, wherein the electronics include memory, and the plurality of preprogrammed modes are stored in memory.

35. The portable lighting device of claim 34, wherein a plurality of sequences are stored in the memory.

36. The portable lighting device of claim 29, wherein the electronics are further configured to acknowledge an opening of the electrical circuit lasting more than a predetermined time.

37. The portable lighting device of claim 36, wherein the predetermined time is more than one second.

38. The portable lighting device of claim 29, wherein the electronics are further configured to acknowledge the user engaging the power switch for more than a predetermined time after the electrical circuit is closed.

39. The portable lighting device of claim 38, wherein the predetermined time is more than two seconds.

40. The portable lighting device of claim 29, wherein the electronics are further configured to provide power to the light source to emit a single blink, two blinks, three blinks or four blinks, with each set of blink(s) being associated with a different sequence of modes.

* * * * *